US005754640A

United States Patent [19]

Sosnowski

[11] Patent Number: 5,754,640
[45] Date of Patent: May 19, 1998

[54] APPARATUS AND METHOD FOR QUALIFYING TELEPHONE NUMBERS FOR A TELEPHONE NETWORK

[75] Inventor: Thomas P. Sosnowski, Wayland, Mass.

[73] Assignee: Unifi Communications, Inc., Lowell, Mass.

[21] Appl. No.: 566,181

[22] Filed: Dec. 1, 1995

[51] Int. Cl.$^6$ .................................................. H04M 7/00
[52] U.S. Cl. ........................... 379/221; 379/207; 379/211; 379/220
[58] Field of Search ................................ 379/100, 201, 379/207, 219, 220, 221, 355, 112, 113, 114, 115, 111, 93, 94, 356, 211

[56] References Cited

U.S. PATENT DOCUMENTS

| | | | |
|---|---|---|---|
| 3,736,383 | 5/1973 | Le Baron | 379/197 |
| 4,332,985 | 6/1982 | Samuel | 379/353 |
| 4,447,676 | 5/1984 | Harris et al. | 379/199 |
| 4,555,594 | 11/1985 | Friedes et al. | 379/220 |
| 4,565,903 | 1/1986 | Riley | 379/201 |
| 4,645,879 | 2/1987 | Simmons | 379/355 |
| 4,751,728 | 6/1988 | Treat | 379/114 |
| 4,866,763 | 9/1989 | Cooper et al. | 379/201 |
| 4,905,273 | 2/1990 | Gordon et al. | 379/93.01 |
| 5,018,191 | 5/1991 | Catron et al. | 379/211 |
| 5,033,079 | 7/1991 | Catron et al. | 379/211 |
| 5,333,184 | 7/1994 | Doherty et al. | 379/115 |
| 5,406,620 | 4/1995 | Pei | 379/221 |
| 5,420,914 | 5/1995 | Blumhardt | 379/114 |
| 5,473,681 | 12/1995 | Partridge, III | 379/221 |
| 5,475,749 | 12/1995 | Akinpelu et al. | 379/221 |
| 5,533,107 | 7/1996 | Irwin et al. | 379/221 |
| 5,550,910 | 8/1996 | DeJager | 379/201 |
| 5,550,912 | 8/1996 | Akinpelu et al. | 379/201 |
| 5,550,915 | 8/1996 | Partridge, III | 379/355 |
| 5,553,129 | 9/1996 | Partridge, III | 379/220 |

*Primary Examiner*—Krista Zele
*Assistant Examiner*—Scott Wolinsky
*Attorney, Agent, or Firm*—Wolf, Greenfield & Sacks, P.C.

[57] ABSTRACT

An apparatus and method for qualifying telephone numbers for a telephone network according to whether the telephone network services the particular area associated with a dialed telephone number, and whether the dialed telephone number is associated with a particular type of terminal equipment. The method according to the present invention comprises the steps of: monitoring a telephone line for outgoing calls; intercepting an outgoing destination telephone number on the telephone line; comparing the outgoing destination telephone number to at least one destination telephone number stored in a database; making a connection between the telephone line and a selective telephone network if the outgoing destination telephone number matches the at least one stored destination telephone number; and making a connection between the telephone line and a standard telephone network if the outgoing destination telephone number does not match the at least one stored destination telephone number. In the event that a connection is made with a standard telephone network, the telephone line is monitored for activity and if activity is detected, the outgoing destination telephone number becomes qualified and is then stored in the database.

35 Claims, 3 Drawing Sheets

5,754,640

APPARATUS AND METHOD FOR QUALIFYING TELEPHONE NUMBERS FOR A TELEPHONE NETWORK

FIELD OF INVENTION

The present invention relates generally to autodialers and, more particularly, to an apparatus and method for qualifying telephone numbers for a telephone network.

BACKGROUND OF THE INVENTION

An autodialer, also known as a call diverter, is a device that provides telecommunications service subscribers with transparent access to telecommunications service providers other than the Public Switched Telephone Network (PSTN). Such alternative telecommunications service providers are typically long distance carriers which offer lower rates or other benefits. An autodialer is usually connected in series between the terminal equipment of a telecommunications service subscriber and a central switching office of the PSTN. Its basic function is to screen telephone numbers dialed by the terminal equipment of a telecommunications service subscriber and, based upon specific criteria, route calls to a telecommunications service provider other than the PSTN. The autodialer reaches the alternative telecommunications service provider by dialing a specific telephone number to the central switching office of the PSTN (i.e. an access number to the alternative telecommunications service provider), which then routes the call directly to the alternative telecommunications service provider. Upon answering the call, the alternative telecommunications service provider either requests or is automatically sent information identifying the particular service subscriber as well as the destination telephone number. Once it has relayed this information to the alternative telecommunications service provider, the autodialer allows the telecommunications service subscriber to directly communicate with the alternative telecommunications service provider.

Although the above-described autodialer does route calls to a telecommunications service provider other than the PSTN, it does nothing to qualify those calls before routing them to the alternative telecommunications service provider besides merely identifying the type of call (i.e. a long distance call) that was dialed. Such a shortcoming is significant because in some circumstances it is desirable to qualify calls according to whether the alternative telecommunications service provider services the particular area associated with the dialed telephone number, or whether the dialed telephone number is associated with a particular type of terminal equipment. The latter is particularly desirable in the case of facsimile communications, as will be described below.

Accordingly, it would be desirable to provide an apparatus and method for qualifying telephone numbers for a telephone network according to whether the telephone network services the particular area associated with a dialed telephone number, and whether a dialed telephone number is associated with a particular type of terminal equipment.

SUMMARY OF THE INVENTION

The present invention contemplates an apparatus and method for qualifying telephone numbers for a telephone network according to whether the telephone network services the particular area associated with a dialed telephone number, and whether the dialed telephone number is associated with a particular type of terminal equipment.

An apparatus according to the present invention comprises: means for monitoring a telephone line for outgoing calls; means for intercepting an outgoing destination telephone number on the telephone line; means for comparing the outgoing destination telephone number to at least one stored destination telephone number; means for making a connection between the telephone line and a selective telephone network if the outgoing destination telephone number matches the at least one stored destination telephone number; and means for making a connection between the telephone line and a standard telephone network if the outgoing destination telephone number does not match the at least one stored destination telephone number. If the connection is made to a standard telephone network, the apparatus may further include means for monitoring the telephone line for activity and if activity is detected, means for adding the outgoing destination telephone number to the database.

A method according to the present invention comprises the steps of: monitoring a telephone line for outgoing calls; intercepting an outgoing destination telephone number on the telephone line; comparing the outgoing destination telephone number to at least one stored destination telephone number; making a connection between the telephone line and a selective telephone network if the outgoing destination telephone number matches the at least one stored destination telephone number; and making a connection between the telephone line and a standard telephone network if the outgoing destination telephone number does not match the at least one stored destination telephone number. If the connection is made to a standard telephone network, a further step includes monitoring the telephone line for activity and if activity is detected, adding the outgoing destination telephone number to the telephone number database.

From the above descriptive summary it is apparent how the present invention apparatus and method overcome the shortcomings of the above-mentioned prior art.

Accordingly, the primary object of the present invention is to provide an apparatus and method for qualifying telephone numbers for a telephone network according to whether the telephone network services the particular area associated with a dialed telephone number, and whether the dialed telephone number is associated with a particular type of terminal equipment.

The above primary object, as well as other objects, features, and advantages, of the present invention will become readily apparent from the following detailed description which is to be read in conjunction with the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
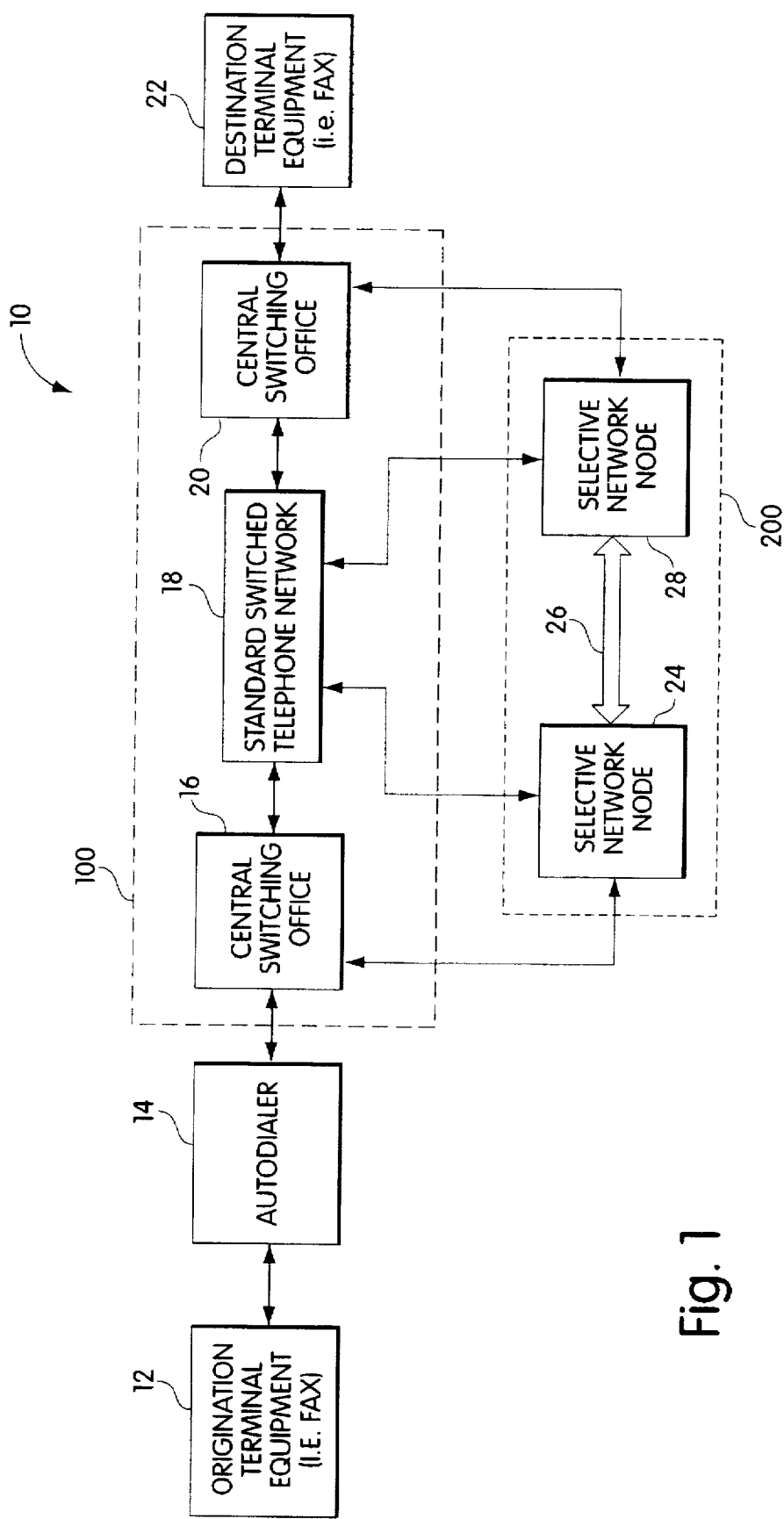
FIG. 1 is a schematic diagram of a communications network according to the present invention.

Referring to FIG. 1, there is shown a schematic diagram of a communications network 10 according to the present invention. The communications network 10 comprises origination terminal equipment 12, an autodialer 14, a first central switching office 16, a standard switched telephone network 18, a second central switching office 20, destination terminal equipment 22, a first selective network node 24, a selective carrier circuit 26, and a second selective network node 28. The first central switching office 16, the standard switched telephone network 18, and the second central switching office 20 are all contained within a standard telephone network (i.e. a PSTN) 100, while the first selective network node 24, the selective carrier circuit 26, and the second selective network node 28 are all contained within a selective telephone network 200.

In this preferred embodiment, both the origination terminal equipment 12 and the destination terminal equipment 22 are facsimile machines, but other telecommunication devices may be similarly utilized in accordance with the present invention as would be apparent to one with ordinary skill in the art after reading this detailed description.

The standard switched telephone network 18 is shown connecting the first central switching office 16 and the second central switching office 20. In this preferred embodiment, the standard switched telephone network 18 is a standard long distance signal carrier, but a standard local signal carrier may be similarly utilized in accordance with the present invention as would be apparent to one with ordinary skill in the art after reading this detailed description.

The selective carrier circuit 26 is shown connecting the first selective network node 24 and the second selective network node 28. In this preferred embodiment, the selective carrier circuit 26 is a selective long distance signal carrier circuit used exclusively to carry long distance facsimile traffic, but a selective local signal carrier circuit for carrying traffic of various kinds may be similarly utilized in accordance with the present invention as would be apparent to one with ordinary skill in the art after reading this detailed description.

The autodialer 14 contains a database of telephone numbers which are routinely dialed by the origination facsimile machine 12. In response to an "off-hook" condition by the origination facsimile machine 12, indicating an impending outgoing facsimile call, the autodialer 14 presents an "off-hook" condition signal to the first central switching office 16 so as to prevent incoming calls and to the origination facsimile machine 12 so as to maintain a connection therebetween. The autodialer 14 then begins to intercept the digits of the telephone number being dialed by the origination facsimile machine 12 so as to first determine if the call is destined for an area that is served by the selective telephone network 200. Typically, an area that is served by the selective telephone network 200 is determined by the international access code, the country code, the area code, and/or the exchange of the telephone number.

If the call is not destined for an area that is served by the selective telephone network 200, the autodialer 14 immediately begins transmitting the digits of the telephone number that was dialed by the origination facsimile machine 12 to the first central switching office 16 for completion of the call through the standard telephone network 100 to the destination facsimile machine 22. It should be noted that, for long distance calls, the standard switched telephone network 18 and the second central switching office 20 would be utilized to make the connection to the destination facsimile machine 22. However, for local calls, the destination facsimile machine 22 could very likely be connected to the first central switching office 16 thereby allowing the first central switching office 16 to make a direct connection to the destination facsimile machine 22, eliminating the need for the standard switched telephone network 18 and the second central switching office 20.

If the call is destined for an area that is served by the selective telephone network 200, the autodialer 14 compares the telephone number that was dialed by the origination facsimile machine 12 to telephone numbers stored in the telephone number database. If a match is found, the autodialer 14 dials an access number of the selective telephone network 200 through the first central switching office 16 so as to make a connection with the first selective network node 24. The autodialer 14 then transmits the telephone number that was dialed by the origination facsimile machine 12 and required subscriber information to the first selective network node 24. Finally, the autodialer 14 connects the origination facsimile machine 12 directly to the selective telephone network 200 via the first selective network node 24.

The selective telephone network 200, which in this preferred embodiment is a store and forward facsimile telephone network, communicates directly with the origination facsimile machine 12 via the first selective network node 24 in an ordinary manner whereby the first selective network node 24 stores all of the data transmitted by the origination facsimile machine 12. The first selective network node 24 forwards the stored data to the second selective network node 28 over the selective carrier circuit 26. The second selective network node 28 then makes a connection to the destination facsimile machine 22 through the second central switching office 20 and transmits the stored data to the destination facsimile machine 22.

It should be noted that, for long distance calls, the second selective network node 28 is utilized to make the connection to the destination facsimile machine 22 through the second central switching office 20. However, for local calls, the destination facsimile machine 22 could be connected to the first central switching office 16 thereby allowing the first selective network node 24 to make a connection to the destination facsimile machine 22 through the first central switching office 16. In any case, the connection between the second selective network node 28 and the destination facsimile machine 22 can be automatically attempted several times if a "busy" or "no answer" signal first results.

Up to this point, the connections between the selective telephone network 200 and the origination facsimile machine 12 and the destination facsimile machine 22 have been described as being made directly through the first central switching office 16 and the second central switching office 20, respectively. However, if the first selective network node 24 is not within the local calling area of the origination facsimile machine 12 or if the second selective network node 28 is not within the local calling area of the destination facsimile machine 22 (i.e. a long distance access number to the selective telephone network 200 is required), then the connection between the selective telephone network 200 and the origination facsimile machine 12 and the destination facsimile machine 22 will have to be made through both the first central switching office 16 and the standard switched telephone network 18 and the standard switched telephone network 18 and the second central switching office 20, respectively. All of these connection schemes are provided for in the communications network 10 of FIG. 1.

If no match is found between the telephone number that was dialed by the origination facsimile machine 12 and the telephone numbers stored in the telephone number database, the autodialer 14 initiates a process to determine if the telephone number that was dialed by the origination facsimile machine 12 is indeed associated with a facsimile machine. The autodialer 14 first transmits the digits of the telephone number that was dialed by the origination facsimile machine 12 to the first central switching office 16 for completion of the call through the standard telephone network 100 to the destination facsimile machine 22. Remaining on the line, the autodialer 14 then monitors the progress of the call. If something other than a facsimile machine answers, the autodialer 14 ignores the remainder of the call and returns to a quiescent mode waiting for a new call to be initiated. If, on the other hand, a facsimile machine answers, the autodialer 14 detects the event and stores that particular telephone number in the telephone number database for future reference. If that particular telephone number is again dialed by the origination facsimile machine 12, the call will be routed to the selective telephone network 200 for processing.

Figure 2:
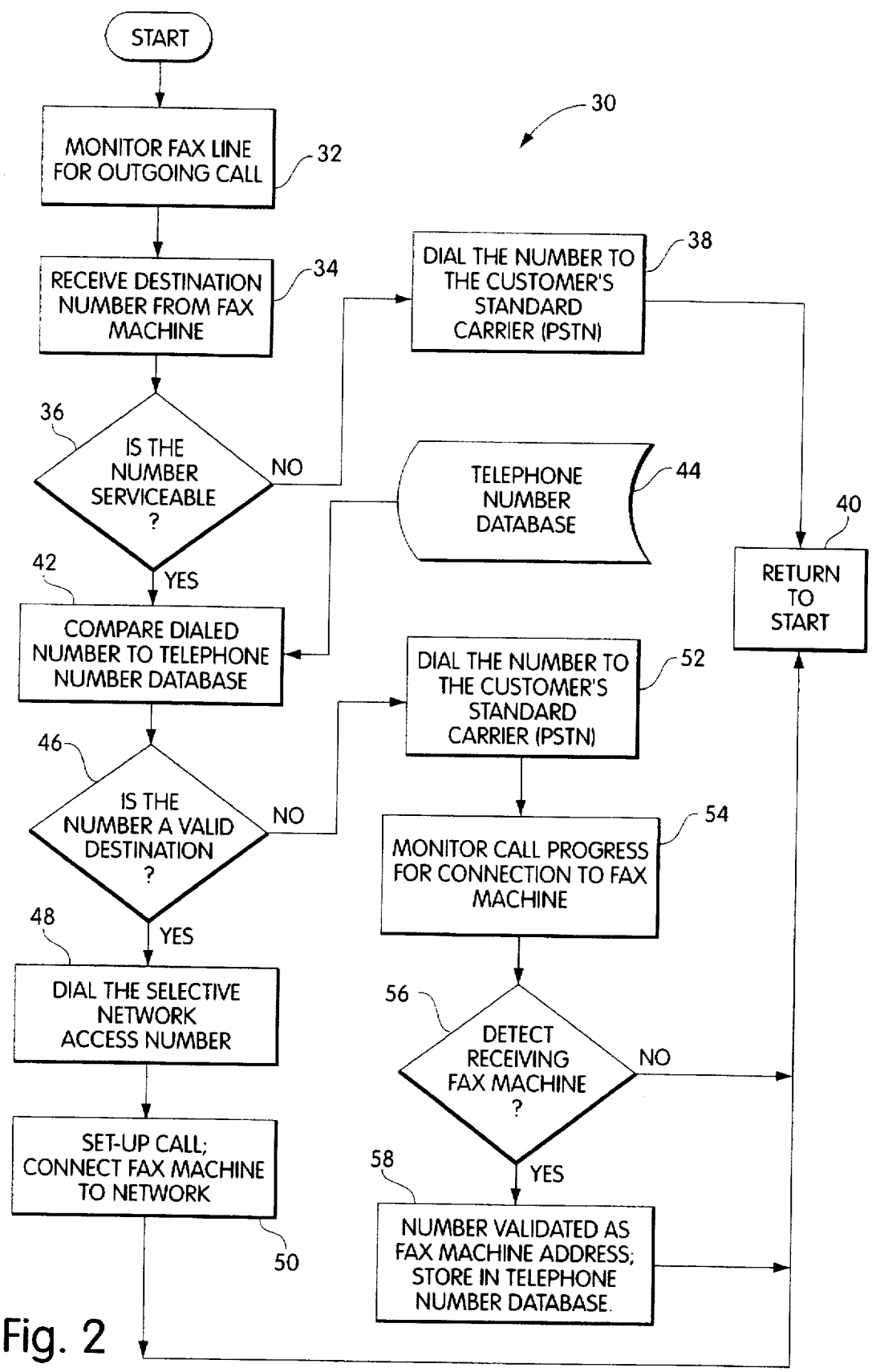
FIG. 2 is a flow chart diagram showing the various steps in a first preferred method for qualifying telephone numbers for a selective telephone network according to the present invention.

Referring to FIG. 2, there is shown a flow chart diagram revealing the various steps in a first preferred method 30 for qualifying telephone numbers for a selective telephone network according to the present invention. In this first preferred method 30, the selective telephone network is a long distance store and forward facsimile telephone network used exclusively to carry long distance facsimile traffic, but either a long distance or a local network for carrying traffic of various kinds may be similarly utilized according to the present invention as would be apparent to one with ordinary skill in the art after reading this detailed description.

A first step 32 in this method 30 comprises monitoring a telephone line for outgoing calls. This first step 32 typically comprises detecting an "off-hook" condition by an origination facsimile machine, indicating an impending outgoing facsimile call, and then providing and "off-hook" condition signal to a central switching office so as to prevent incoming calls and to the origination facsimile machine so as to maintain an operative connection.

A second step 34 in this method 30 comprises intercepting an outgoing destination telephone number on the telephone line. This second step 34 typically comprises detecting and temporarily storing any signals being transmitted over the telephone line which represent the individual digits of an outgoing destination telephone number.

A third step 36 in this method 30 comprises determining if the outgoing destination telephone number is associated with a region that is serviced by the selective telephone network. This third step 36 typically comprises examining the temporarily stored signals representing the individual digits of the outgoing destination telephone number to see if the international access code, the country code, the area code, and/or the exchange of the outgoing destination telephone number are associated with a region that is serviced by the selective telephone network.

If the outgoing destination telephone number is associated with a region that is not serviced by the selective telephone network, then a fourth step 38 is performed wherein a connection is made between the telephone line and a standard telephone network, and the method 30 returns to its starting point 40. This fourth step 38 typically comprises retransmitting the temporarily stored signals representing the individual digits of the outgoing destination telephone number to a central switching office for completion of a call through a standard telephone network to a destination facsimile machine.

If, on the other hand, the outgoing destination telephone number is associated with a region that is serviced by the selective telephone network, then a fifth step 42 is performed wherein the outgoing telephone number is compared to valid destination telephone numbers stored in a telephone number database 44, and then a sixth step 46 is performed wherein a determination is made as to whether the outgoing destination telephone number matches at least one of the stored destination telephone numbers.

If the outgoing destination telephone number matches at least one of the stored destination telephone numbers, then a seventh step 48 is performed wherein a connection is made between the telephone line and the selective telephone network, and then an eighth step 50 is performed wherein the selective network communicates directly with an origination facsimile machine attached to the telephone line. The seventh step 48 typically comprises dialing an access number of the selective telephone network through a central switching office, transmitting subscriber information to the selective telephone network, and retransmitting the temporarily stored signals representing the individual digits of the outgoing destination telephone number to the selective telephone network. The eighth step 50 typically comprises having the selective telephone network store data transmitted by the origination facsimile machine attached to the telephone line.

If, on the other hand, the outgoing destination telephone number does not match at least one of the stored destination telephone numbers, then a ninth step 52 is performed wherein a connection is made between the telephone line and a standard telephone network. This ninth step 52 typically comprises retransmitting the temporarily stored signals representing the individual digits of the outgoing destination telephone number to a central switching office for completion of a call through a standard telephone network to a destination facsimile machine.

A tenth step 54 in this method 30 comprises monitoring the telephone line for activity after making the connection between the telephone line and the standard telephone network. An eleventh step 56 in this method 30 comprises detecting activity on the telephone line. This eleventh step 56 typically comprises detecting facsimile communication signals being transmitted by a destination facsimile machine over the telephone line.

If no activity is detected on the telephone line, then it is determined that the outgoing destination telephone number is not in fact associated with a facsimile machine and the method returns to its starting point 40. If, on the other hand, activity is detected on the telephone line, then a twelfth step 58 in this method 30 is performed wherein it is determined that the outgoing destination telephone number is in fact associated with a facsimile machine and the outgoing destination telephone number is stored along with the other valid telephone numbers in the telephone number database 44. Thus, if that particular outgoing destination telephone number is again detected on the telephone line, a connection will be made between the telephone line and the selective telephone network as described above in the seventh step 48.

At this point it should be noted that throughout the above-described method 30 the various processing steps of intercepting, detecting, storing, determining, and comparing the outgoing destination telephone number can be performed on the entire outgoing destination telephone number or on the individual digits of the outgoing destination telephone number. It should also be noted, however, that it is generally preferred to perform the processing steps on the individual digits of the outgoing destination telephone number since the individual digits of the outgoing destination telephone number are serially transmitted over the telephone line.

Figure 3:
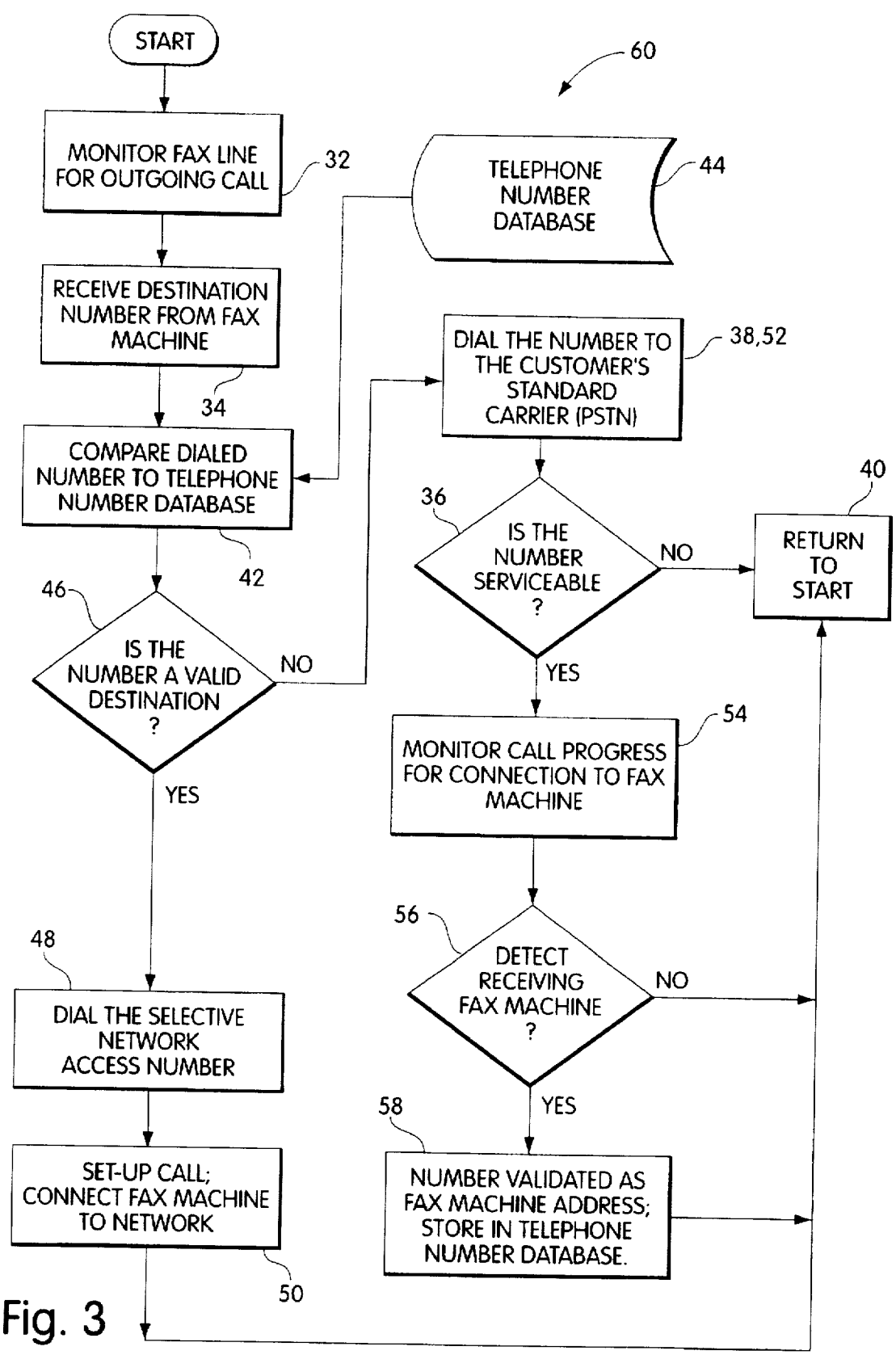
FIG. 3 is a flow chart diagram showing the various steps in a second preferred method for qualifying telephone numbers for a selective telephone network according to the present invention.

Referring to FIG. 3, there is shown a flow chart diagram revealing the various steps in a second preferred method 60 for qualifying telephone numbers for a selective telephone network according to the present invention. As in the first preferred method 30, the selective telephone network in this second preferred method 60 is a long distance network used exclusively to carry long distance facsimile traffic, but either a long distance or a local network for carrying traffic of various kinds may be similarly utilized according to the present invention as would be apparent to one with ordinary skill in the art after reading this detailed description. The steps in this second preferred method 60 are the same as the steps in the first preferred method 30, and are numbered as such. However, the step 36 of determining if the outgoing destination telephone number is associated with a region that is serviced by the selective telephone network is located at a different point in the flowchart sequence in the second method 60. Even with this relocation change, both the first preferred method 30 and the second preferred method 60 still result in the elimination of all non-facsimile calls from the selective telephone network.

In a specific implementation, the present invention is utilized in a selective store and forward facsimile telephone network to exclusively carry international facsimile traffic. The autodialer would provide subscribers with totally transparent access to the selective network as it screens telephone numbers sent to it by an attached facsimile machine. Domestic calls are allowed to pass through the autodialer without diversion. However, international calls bound for destinations served by the selective network are intercepted and rerouted through the selective network in the manner described above.

One feature of such a specific implementation is an unequivocal guarantee to deliver a facsimile document of a subscriber. Automated equipment contained in the selective network would make several attempts to deliver the document in the event of "busy" or "no answer" signals. If these attempts fail, however, the document would have to be delivered with manual intervention. Needless to say, such manual intervention is expensive, and thus it is imperative that such manually assisted deliveries be reduced to a minimum. Research has shown that the leading cause of such manually assisted deliveries is calls that terminate on voice rather than facsimile terminals. That is, for a variety of reasons, wrong numbers are keyed into the sending facsimile machine. The present invention allows the autodialer to prevent such wrong numbers from ever entering the selective network.

The present invention is not to be limited in scope by the specific embodiment described herein. Indeed, various modifications to the present invention, in addition to those described herein, will be apparent to those of skill in the art from the foregoing description and accompanying drawings. Thus, such modifications are intended to fall within the scope of the appended claims.

What is claimed is:

1. A method for qualifying telephone numbers for a selective telephone network, said method comprising the steps of:

monitoring a telephone line for outgoing calls;

intercepting on said telephone line an outgoing call comprising an outgoing destination telephone number for a destination terminal equipment;

comparing said outgoing destination telephone number to at least one stored destination telephone number;

making a connection between said telephone line and a selective telephone network if said outgoing destination telephone number matches said at least one stored destination telephone number; and if said outgoing destination telephone number does not match said at least one stored destination telephone number, making a connection between said telephone line and a standard telephone network and, if activity is detected on said telephone line when connected to said standard telephone network which qualifies said outgoing destination telephone number, storing said outgoing destination telephone number, wherein subsequent outgoing calls to said outgoing destination telephone number are automatically sent to said selective telephone network.

2. The method as defined in claim 1, wherein said step of making a connection between said telephone line and said selective telephone network comprises dialing an access telephone number of said selective telephone network.

3. The method as defined in claim 1, wherein said detected activity on said telephone line comprises detected facsimile communication signals on said telephone line.

4. The method as defined in claim 1, further comprising the steps of:

determining if said outgoing destination telephone number is associated with a region that is serviced by said selective telephone network after making said connection between said telephone line and said standard telephone network;

monitoring said telephone line for said activity after making said connection between said telephone line and said standard telephone network, if said outgoing destination telephone number is associated with a region that is serviced by said selective telephone network; and monitoring said telephone line for outgoing calls, if said outgoing destination telephone number is associated with a region that is not serviced by said selective telephone network.

5. The method as defined in claim 4, wherein said step of determining if said outgoing destination telephone number is associated with a region that is serviced by said selective telephone network comprises examining the international access code of said outgoing destination telephone number.

6. The method as defined in claim 4, wherein said step of determining if said outgoing destination telephone number is associated with a region that is serviced by said selective telephone network comprises examining the country code of said outgoing destination telephone number.

7. The method as defined in claim 4, wherein said step of determining if said outgoing destination telephone number is associated with a region that is serviced by said selective telephone network comprises examining the area code of said outgoing destination telephone number.

8. The method as defined in claim 4, wherein said step of determining if said outgoing destination telephone number is associated with a region that is serviced by said selective telephone network comprises examining the exchange of said outgoing destination telephone number.

9. A method for qualifying telephone numbers for a selective telephone network, said method comprising the steps of:

monitoring a telephone line for outgoing calls;

intercepting on said telephone fine an outgoing call comprising an outgoing destination telephone number for a destination terminal equipment;

determining if said outgoing destination telephone number is associated with a region that is serviced by a selective telephone network if said outgoing destination telephone number is associated with a region that is not serviced by said selective telephone network, making a connection between said telephone line and a standard telephone network;

if said outgoing destination telephone number is associated with a region that is serviced by said selective telephone network, comparing said outgoing destination telephone number to at least one stored destination telephone number;

making a connection between said telephone line and said selective telephone network if said outgoing destination telephone number matches said at least one stored destination telephone number; and if said outgoing destination telephone number does not match said at least one stored destination telephone number, making a connection between said telephone line and said standard telephone network and, if activity is detected on said telephone line when connected to said standard telephone network which qualifies said outgoing destination telephone number, storing said outgoing destination telephone number, wherein subsequent outgoing calls to said outgoing destination telephone number are automatically sent to said selective telephone network.

10. The method as defined in claim 9, wherein said step of determining if said outgoing destination telephone number is associated with a region that is serviced by said selective telephone network comprises examining the international access code of said outgoing destination telephone number.

11. The method as defined in claim 9, wherein said step of determining if said outgoing destination telephone number is associated with a region that is serviced by said selective telephone network comprises examining the country code of said outgoing destination telephone number.

12. The method as defined in claim 9, wherein said step of determining if said outgoing destination telephone number is associated with a region that is serviced by said selective telephone network comprises examining the area code of said outgoing destination telephone number.

13. The method as defined in claim 9, wherein said step of determining if said outgoing destination telephone number is associated with a region that is serviced by said selective telephone network comprises examining the exchange of said outgoing destination telephone number.

14. A method for qualifying telephone numbers for a selective telephone network, said method comprising the steps of:

monitoring a telephone line for outgoing calls;

intercepting an outgoing call comprising an outgoing destination telephone number on said telephone line;

comparing said outgoing destination telephone number to at least one stored destination telephone number;

making a connection between said telephone line and a selective telephone network if said outgoing destination telephone number matches said at least one stored destination telephone number;

making a connection between said telephone line and a standard telephone network if said outgoing destination telephone number does not match said at least one stored destination telephone number and;

monitoring said telephone line for activity after making said connection between said telephone line and said standard telephone network;

detecting activity on said telephone line; and storing said outgoing destination telephone number along with said at least one stored destination number.

15. The method as defined in claim 14, wherein said step of detecting activity on said telephone line comprises detecting facsimile communication signals on said telephone line.

16. The method as defined in claim 14, further comprising the steps of:

determining if said outgoing destination telephone number is associated with a region that is serviced by said selective telephone network after making said connection between said telephone line and said standard telephone network;

performing said step of monitoring said telephone line for activity after making said connection between said telephone line and said standard telephone network, and all subsequent steps, if said outgoing destination telephone number is associated with a region that is serviced by said selective telephone network; and performing said step of monitoring said telephone line for outgoing calls, and all subsequent steps, if said outgoing destination telephone number is associated with a region that is not serviced by said selective telephone network.

17. The method as defined in claim 16, wherein said step of determining if said outgoing destination telephone number is associated with a region that is serviced by said selective telephone network comprises examining the international access code of said outgoing destination telephone number.

18. The method as defined in claim 16, wherein said step of determining if said outgoing destination telephone number is associated with a region that is serviced by said selective telephone network comprises examining the country code of said outgoing destination telephone number.

19. The method as defined in claim 16, wherein said step of determining if said outgoing destination telephone number is associated with a region that is serviced by said selective telephone network comprises examining the area code of said outgoing destination telephone number.

20. The method as defined in claim 16, wherein said step of determining if said outgoing destination telephone number is associated with a region that is serviced by said selective telephone network comprises examining the exchange of said outgoing destination telephone number.

21. The method as defined in claim 14, further comprising the steps of:

determining if said outgoing destination telephone number is associated with a region that is serviced by said selective telephone network after intercepting said outgoing call comprising said outgoing destination telephone number on said telephone line;

performing said step of making a connection between said telephone line and said standard telephone network, and all subsequent steps, if said outgoing destination telephone number is associated with a region that is not serviced by said selective telephone network; and performing said step of comparing said outgoing destination telephone number to said at least one stored destination telephone number, and all subsequent steps, if said outgoing destination telephone number is associated with a region that is serviced by said selective telephone network.

22. The method as defined in claim 21, wherein said step of determining if said outgoing destination telephone number is associated with a region that is serviced by said selective telephone network comprises examining the international access code of said outgoing destination telephone number.

23. The method as defined in claim 21, wherein said step of determining if said outgoing destination telephone number is associated with a region that is serviced by said selective telephone network comprises examining the country code of said outgoing destination telephone number.

24. The method as defined in claim 21, wherein said step of determining if said outgoing destination telephone number is associated with a region that is serviced by said selective telephone network comprises examining the area code of said outgoing destination telephone number.

25. The method as defined in claim 21, wherein said step of determining if said outgoing destination telephone number is associated with a region that is serviced by said selective telephone network comprises examining the exchange of said outgoing destination telephone number.

26. An apparatus for qualifying telephone numbers for a selective telephone network, said apparatus comprising:
means for monitoring a telephone line for outgoing calls;
means for intercepting on said telephone line an outgoing all comprising an outgoing destination telephone number for a destination terminal equipment;
means for comparing said outgoing destination telephone number to at least one stored destination telephone number;
means for making a connection between said telephone line and a selective telephone network if said outgoing destination telephone number matches said at least one stored destination telephone number;
means for making a connection between said telephone line and a standard telephone network if said outgoing destination telephone number does not match said at least one stored destination telephone number;
means for monitoring said telephone line for activity when said means for making a connection connects said telephone line to said standard telephone network;
means for detecting activity on said telephone line which qualifies said outgoing destination telephone number; and
means for storing said outgoing destination telephone number, in response to said means for detecting activity on said telephone line:
wherein subsequent outgoing calls to said outgoing destination telephone number are automatically sent to said selective telephone network.

27. The apparatus as defined in claim 26, further comprising means for determining if said outgoing destination telephone number is associated with a region that is serviced by said selective telephone network after said means for making makes said connection between said telephone line and said standard telephone network.

28. An apparatus for qualifying telephone numbers for a selective telephone network, said apparatus comprising:
means for monitoring a telephone line for outgoing calls;
means for intercepting on said telephone line an outgoing call comprising an outgoing destination telephone number for a destination terminal equipment;
means for determining if said outgoing destination telephone number is associated with a region that is serviced by a selective telephone networks;
means for comparing said outgoing destination telephone number to at least one stored destination telephone number;
means for making a connection between said telephone line and a selective telephone network if said outgoing destination telephone number matches said at least one stored destination telephone number;
means for making a connection between said telephone line and a standard telephone network if said outgoing destination telephone number does not match said at least one stored destination telephone number;
means for monitoring said telephone line for activity when said means for making a connection connects said telephone line to said standard telephone network;
means for detecting activity on said telephone line which qualifies said outgoing destination telephone number; and
means for storing said outgoing destination telephone number, in response to said means for detecting activity on said telephone line;
wherein subsequent outgoing calls to said outgoing destination telephone number are automatically sent to said selective telephone network.

29. An apparatus for qualifying telephone numbers for a selective telephone network, said apparatus comprising:
means for monitoring a telephone line for outgoing calls;
means for intercepting an outgoing call comprising an outgoing destination telephone number on said telephone line;
means for comparing said outgoing destination telephone number to at least one stored destination telephone number;
means for making a connection between said telephone line and a selective telephone network if said outgoing destination telephone number matches said at least one stored destination telephone number;
means for making a connection between said telephone line and a standard telephone network if said outgoing destination telephone number does not match said at least one stored destination telephone number;
means for monitoring said telephone line for activity after making said connection between said telephone line and said standard telephone network;
means for detecting activity on said telephone line; and
means for storing said outgoing destination telephone number along with said at least one stored destination telephone number.

30. The apparatus as defined in claim 29, further comprising means for determining if said outgoing destination telephone number is associated with a region that is serviced by said selective telephone network after said means for making makes said connection between said telephone line and said standard telephone network.

31. The apparatus as defined in claim 29, further comprising means for determining if said outgoing destination telephone number is associated with a region that is serviced by said selective telephone network after intercepting said outgoing call comprising said outgoing destination telephone number on said telephone line.

32. The method or apparatus of any one of claims 1, 9, 14, 26, 28, and 29, wherein the selective telephone network is a facsimile traffic network.

33. The method or apparatus of any one of claims 1, 9, 14, 26, 28, and 29, wherein the selective telephone network is a store-and-forward facsimile traffic network.

34. The method or apparatus of any one of claims 1, 9, 14, 26, 28, and 29, wherein the stored destination telephone number represents a destination facsimile machine.

35. The method or apparatus of any one of claims 14 and 29, wherein the outgoing destination telephone number is for a destination terminal equipment.

* * * * *